United States Patent [19]

Bowsky

[11] 4,279,975
[45] Jul. 21, 1981

[54] HERMETIC SEAL CLOSURE

[75] Inventor: Benjamin Bowsky, Warren County, Ohio

[73] Assignee: Emerson Electric Co., St. Louis, Mo.

[21] Appl. No.: 157,900

[22] Filed: Jun. 9, 1980

[51] Int. Cl.³ .............................................. H01M 2/02
[52] U.S. Cl. .................................... 429/181; 429/185
[58] Field of Search ............... 429/185, 181, 184, 171, 429/174

[56] References Cited

U.S. PATENT DOCUMENTS

| 3,380,857 | 4/1968 | Bilhorn | 429/184 X |
| 4,122,243 | 10/1978 | Tsuchida et al. | 429/174 |
| 4,158,721 | 6/1979 | Decker et al. | 429/184 X |

Primary Examiner—Charles F. LeFevour
Attorney, Agent, or Firm—Polster, Polster and Lucchesi

[57] ABSTRACT

A hermetic seal closure for a battery having a case containing corrosive liquid, the case including an end wall with an aperture in it, has an axially outturned lip in the end wall defining the aperture. The lip has a generally flat, free radial surface. A washer of material substantially impervious and resistant to the corrosive liquid covers the free radial surface of the lip. The washer has an under surface projecting radially beyond the perimeter of the lip. A terminal cap of electrically conductive material has a cavity defined by an inner side wall and a central web. The inner side wall embraces the washer and projects axially beyond the washer toward the case end wall, but is spaced axially from the case end wall. Bonding material is bonded to and extends hermetically uninterruptedly through the space between the outer side wall of the lip and the inner side wall of the cap and between those side walls and the under surface of the washer, bonding the cap, washer and case to one another.

10 Claims, 6 Drawing Figures

HERMETIC SEAL CLOSURE

BACKGROUND OF THE INVENTION

This invention has particular application to hermetic seal closures for a lithium battery, especially of the rechargeable type. Lithium batteries pose difficult problems, because the electrolyte tends to leak. The battery must be able to withstand substantial internal pressure during the charging operation, and the electrolyte is corrosive against soft glass.

A U.S. patent to Bilhorn, U.S. Pat. No. 3,380,857, sets out the problems and suggests the use of a ceramic or glass seal inside the battery, protected by a compression plug of rubber or the like. U.S. Pat. No. 4,158,721 also discloses a glass seal that extends within the battery, and therefore recommends the use of sealing glass mixed with alumina. One of the objects of this invention is to provide a hermetic seal closure that is simpler and less expensive than closures known heretofore and effective. Other objects will become apparent to those skilled in the art in the light of the following description and accompanying drawing.

SUMMARY OF THE INVENTION

In accordance with this invention, generally stated, in a battery having a sealed case containing corrosive liquid, the case including an end wall with an aperture in it, an axially outturned lip is provided in the end wall, the lip having an outer side wall, an inner side wall defining the aperture, and a generally flat, free radial surface between the side walls. A washer of material substantially impervious and resisant to the corrosive liquid, having a wall part with an under surface projecting radially beyond the perimeter of the lip, covers the free radial surface of the lip. The washer has an opening extending axially through it, coaxial with the lip aperture. A terminal cap of electrically conductive material, having a cavity defined by an inner side wall and a central web extending radially inwardly from the boundary defined by that inner side wall, embraces the washer. The inner side wall projects axially beyond the washer toward the case end wall but is spaced axially from the case end wall. Bonding material is bonded to and extends hermetically uninterruptedly through the space between the outer side wall of the lip and the inner side wall of the cap and the under surface of the washer, whereby the cap, washer and case are bonded to one another, and the case is hermetically sealed at the terminal cap.

DETAILED DESCRIPTION OF PREFERRED EMBODIMENTS

Figure 1:
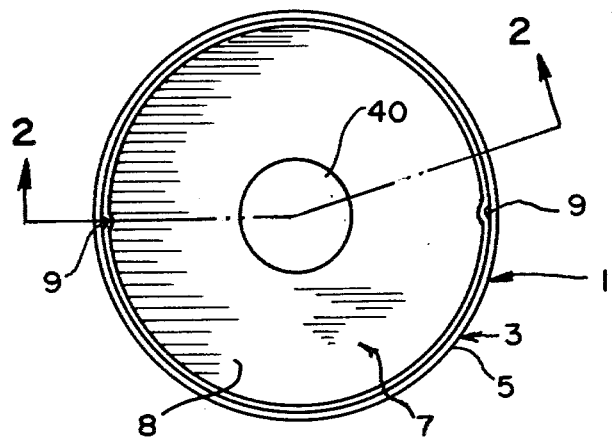
FIG. 1 is a top plan view of a battery provided with one illustrative embodiment of hermetic seal closure of this invention.

Referring now to the drawing for illustrative embodiments of this invention, reference numeral 1 indicates a battery of the rechargable lithium type. The battery 1 has a cylindrical case 3 with a side wall 5, a bottom, not here shown, integral with the side wall, and an upper end wall 7. In the illustrative battery 1, openings 9 serve as filling and vent openings, through which the electrolyte can be introduced after the closure of this invention is installed, if desired, and then hermetically sealed by welding or the like.

The end wall 7 has a top surface 8, and an opening 10, defined by an inner wall 11 of a lip 12. The lip 12 has an outer wall 13, and a free, substantially flat radial surface 16 between the inner wall 11 and the outer wall 13.

A washer 22 has an outer surface 23, an under surface 24, a circular central opening 25, and a peripheral surface 37 parallel to the axis of the case and lip. The term axial is used in describing the preferred embodiments to indicate the direction of the long axis of the cylindrical case, and the term radial, to indicate a direction perpendicular to that axis.

A terminal cap 40 has a cavity 42 defined by an inner surface 45 of a side wall 46, and an under surface 43 of a web 44 extending inwardly from the boundary defined by the inner side wall 46. The terminal cap also has a top surface 55, and a bottom radial surface 56.

The side wall 46 of the terminal cap 40 is closely fitted around the washer peripheral surface 37. The inner side wall 45 of the terminal cap extends axially beyond the under surface of the washer toward the top surface 8 of the end wall 7, but stops short of the top surface 8, leaving an axial space 62 between the bottom surface 56 of the terminal cap and the top surface 8, and a radial space 60 between the outer wall 13 and the lip 12 and the inner surface 45 of the side wall 46 of the terminal cap 40. Bonding material 70 occupies the space 60 and a part of the space 62.

The elements 1 through 70 are broadly common to all of the embodiments described.

Figure 3:
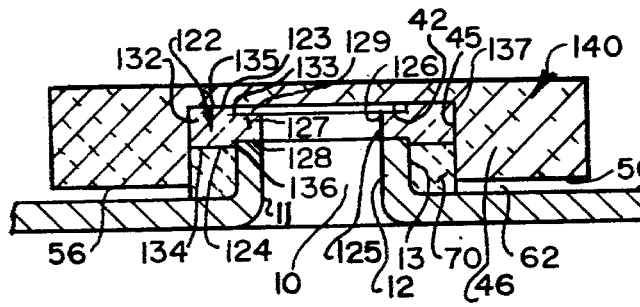
FIG. 3 is an enlarged fragmentary sectional view of one particular embodiment of hermetic seal closure.

Referring now to FIG. 3 for one specific illustrative embodiment, a washer 122 has an outer plane surface 123 and an under surface 124. The outer surface 123 and the inner surface 124 are not uninterruptedly planar, but are stepped toward one another, but both radial reaches of the surfaces are flat. A central opening 125 in the washer is defined by an axial surface 126 of the same diameter as the inner wall 11 of the lip.

The stepping of the outer and under surfaces 123 and 124 defines an annular, radially inwardly extending flange 127, with an upper horizontal surface 129 and a lower horizontal surface 128, and a rim 132. The rim 132 has an upper horizontal surface 135, which with the upper surface 129 defines a shoulder 133, and a lower horizontal surface 134 which, with the lower horizontal surface 128 defines a seat 136, in which the outer wall 13 and flat surface 16 of the lip 12 are closely fitted. The washer 122 has an axially extending peripheral surface 137.

A terminal cap 140 is identical with the terminal cap 40 of the general embodiment described. The under surface of the cavity 42 bears flat against the upper surface 135 of the rim 132, the inner surface 45 of the wall 46 fits closely against the peripheral surface 137 of the washer rim, and the bottom surface 56 stops short of the top surface 8 to leave an axial space 62.

Bonding material 70 is bonded to the outer wall 13 of the lip, the inner surface 45 of the terminal cap, the horizontal lower surface 134 of the washer, and the top surface 8 of the end wall, sealing them hermetically.

In this preferred embodiment, the washer 122 is made of ceramic chemically resistant to corrosion by the electrolyte within the battery, and the bonding material is glass that is not as chemically resistant, but which is an effective bonding agent.

Figure 4:
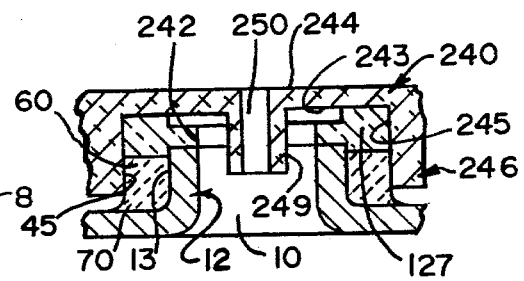
FIG. 4 is a fragmentary sectional view of another embodiment.

In FIG. 4, a second embodiment has a washer identical with the washer 122 of the embodiment of FIG. 3. The hermetic seal closure of this embodiment differs from that of FIG. 3 in having a terminal cap 240 with an annular cavity 242 defined by an under surface 243 of a web 244 and an inner surface 245 of a side wall 246, and a pipe 249. The pipe 249 has a central, open-ended passage 250, and projects axially below the flange 127, within the compass of the lip 12.

Figure 5:
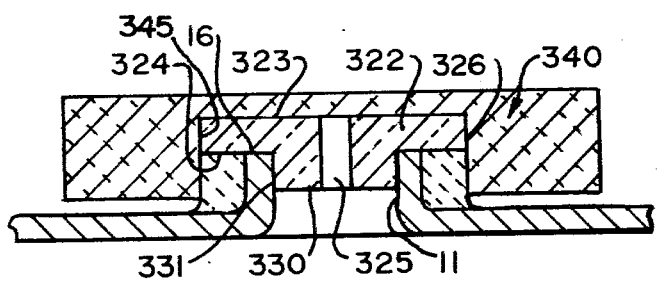
FIG. 5 is a fragmentary sectional view of a third embodiment.

In FIG. 5, an embodiment of hermetic seal closure of this invention has a terminal cap 340 identical with the terminal cap 140 shown in FIG. 3. The embodiment of FIG. 5 differs from that of FIG. 3 in having a washer 322 that is T-shaped in cross-section, with a stem 330 projecting below the free radial surface of the lip. The stem 330 has an axial, central opening 325 extending through it. The washer 322 has an axially outer, radially extending, flat surface 323, and an under surface 324 extending between a peripheral surface 326 and a circumferential surface 331 of the stem 330. The stem 330 projects a substantial distance below the free radial surface 16 of the lip 12, and the surface 331 fits closely within the compass of the inner wall 11 of the lip. The surface 337 fits closely within the compass of inner wall 345.

Figure 6:
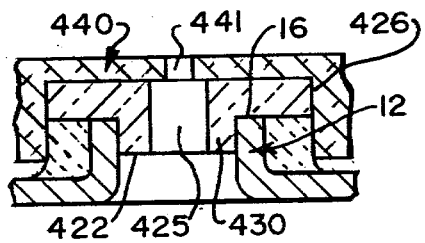
FIG. 6 is a fragmentary sectional view of a fourth embodiment.
Figure 2:
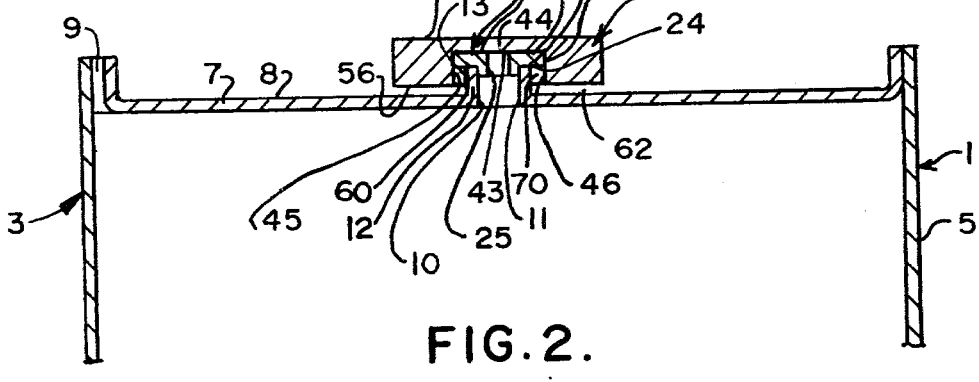
FIG. 2 is a sectional view taken along the line 2—2 of FIG. 2.

In FIG. 6, a fourth embodiment is shown, in which both a washer 422 and terminal cap 440 are slightly different from those of the previously described embodiments. As in the embodiment shown in FIG. 5, the washer is T-shaped in cross section with a stem 430. It differs in that a central opening 425 is of larger diameter than the opening 325 in the previous embodiment. The terminal cap 440 differs from the terminal cap shown in FIGS. 3 and 5 only in being provided with a central opening 441 through it. The opening 441 is coaxial with the opening 425 but is of smaller diameter.

In the embodiments shown in FIGS. 3 and 4, the seating of the upper end of the lip 12 within the compass of the seat formed in the washer 122, and the close fit of the washer 122 within the terminal cap cavity serve to position the parts properly for assembly. A ring of sintered glass is slipped over the lip, the washer and terminal are put in place, and the glass is fused to seal the assembly, in a very simple operation.

Similarly, in the embodiment shown in FIGS. 5 and 6, the stems 330 and 430 of their respective washers serve the fixturing function with respect to the lip, and peripheral surfaces 326 and 426, with respect to the terminal caps 340 and 440, respectively.

In all of the embodiments, the terminal caps, washers and lips have been circular in plan. However, they can be of other shapes, the terms axial and radial being used in the Accompanying claims broadly to encompass those relative directions no matter what the shape of the battery case, lip opening and cap, "axial" being the direction in which the lip tends, and radial, the direction perpendicular to it.

In every embodiment, the washer has positioning means to locate the washer with respect to the lip, to inhibit radial movement, to center the washer and terminal cap with respect to the lip, and, importantly, for forming a labyrinth seal to restrict the amount of corrosive electrolyte that can reach the bonding material 70. The minute amount of electrolyte that may reach the bonding material is not sufficient to destroy or materially weaken the bond even if soft glass is used as the bonding material.

In all of the embodiments shown, the battery can be charged with electrolyte after the terminal cap is sealed in place. In the embodiments shown in FIGS. 3 and 5, a case of the type shown in FIG. 1, can be used in which electrolyte is introduced in one of the holes 10. In the embodiment shown in FIGS. 4 and 6, the holes 10 need not be provided, because the electrolyte can be introduced through the opening in the terminal cap which can then be sealed.

Numerous variations in the construction of the hermetic seal closure of this invention, within the scope of the appended claims, will occur to those skilled in the art in the light of the foregoing disclosure. Merely by way of example, the washer of FIG. 3 can be made with a stem, or the washer of FIG. 6 can be made with an additional step to define an annular channel-seat. The bonding material is preferably soft glass that bonds readily and forms a strong, durable seal, but other bonding materials, such as epoxy may be used, the labyrinth seal formed by the corrosion-resistant ceramic serving to protect the bonding material against effective attack by the corrosive electrolyte. These are merely illustrative.

Having thus described the invention, what is claimed and desired to be secured by Letters Patent is:

1. In a battery having a sealed case containing corrosive liquid, said case including an end wall with an aperture in it, the improvement comprising an axially out turned lip in said end wall, said lip having an outer side wall, an inner side wall and a free radial surface between said side walls, said inner side wall defining said aperture in said end wall; a washer of material substantially impervious and resistant to said corrosive liquid, said washer having a wall part with an under surface projecting radially beyond the perimeter of said lip and covering the free radial surface of said lip and positioning means for locating said washer with respect to said lip, said washer having an opening extending axially through it; a terminal cap of electrically conductive material having a cavity defined by an inner side wall and a central web spanning the boundry defined by said inner side wall, said inner side wall embracing said washer and projecting axially beyond said washer toward said case end wall but spaced axially from said case end wall, and bonding material bonded to and extending hermetically uninterruptedly through space between the said outer side wall of the said lip and the inner side wall of said terminal cap and between those said walls and said under surface of the said washer, whereby the said cap, washer and case are bonded to one another, and the case is hermetically sealed at said terminal cap.

2. The improvement of claim 1 wherein the washer of corrosion resistant material is ceramic.

3. The improvement of claim 1 wherein the bonding material is glass.

4. The improvement of claim 1 wherein the washer positioning means comprises an annular rim and a thinner annular flange radially inward from the rim, defining between them an L-shaped seat in which the free radial surface and a part of the outer side wall of the lip are closely seated.

5. The improvement of claim 1 wherein the terminal cap web is imperforate.

6. The improvement of claim 1 wherein the terminal cap has an aperture communicating directly with the opening in the washer.

7. The improvement of claim 1 wherein the terminal cap is T-shaped in axial cross section with a stem projecting through the opening in the washer.

8. The improvement of claim 1 wherein the washer is T-shaped in axial cross section, and the washer positioning means comprises a central spool mounted closely within the compass of the inner wall of the lip.

9. The improvement of claim 4 wherein the washer is I-shaped in axial cross section.

10. The improvement of claim 8 wherein the terminal cap has a central opening generally co-axial with the opening in the washer.

* * * * *